(12) United States Patent
Yasuno et al.

(10) Patent No.: US 11,614,908 B2
(45) Date of Patent: Mar. 28, 2023

(54) IMAGE FORMING DEVICE PERFORMING TRIM PROCESSING ON STORAGE AREA

(71) Applicant: CANON KABUSHIKI KAISHA, Tokyo (JP)

(72) Inventors: Takashi Yasuno, Chiba (JP); Shintaro Okamura, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 33 days.

(21) Appl. No.: 17/118,337

(22) Filed: Dec. 10, 2020

(65) Prior Publication Data

US 2021/0191677 A1    Jun. 24, 2021

(30) Foreign Application Priority Data

Dec. 20, 2019  (JP) .............................. JP2019-230912

(51) Int. Cl.
*G06F 3/12*  (2006.01)
(52) U.S. Cl.
CPC .......... *G06F 3/1268* (2013.01); *G06F 3/1279* (2013.01); *G06F 3/1287* (2013.01)
(58) Field of Classification Search
None
See application file for complete search history.

(56) References Cited

U.S. PATENT DOCUMENTS

| 2018/0074766 A1* | 3/2018 | Yokomizo | ............. G06F 3/0673 |
| 2021/0019090 A1* | 1/2021 | Tokumoto | ............. G06F 3/0659 |
| 2021/0173594 A1* | 6/2021 | Hasegawa | .......... H04N 1/00933 |

FOREIGN PATENT DOCUMENTS

JP          2015141681 A     8/2015

OTHER PUBLICATIONS

English language machine translation of JP 2015-141681 A to Ichihiro (Year: 2015).*

\* cited by examiner

*Primary Examiner* — Eric A. Rust
(74) *Attorney, Agent, or Firm* — Canon U.S.A., Inc. IP Division

(57) ABSTRACT

An apparatus includes a nonvolatile semiconductor storage having a semiconductor area and configured to execute erasure processing based on information about a storage area in which unused data is stored in the semiconductor area in a case where the information is received, and a controller having one or more processors which execute instructions stored in one or more memories, the controller being configured to notify the semiconductor storage of the information, cause the semiconductor storage to stop the erasure processing by reception of a signal related to a job while the semiconductor storage is executing the erasure processing, and transmit a response signal for the signal related to the job to the semiconductor storage.

19 Claims, 13 Drawing Sheets

FIG.3

| NO. | DATA CONTENT | FLAG | TRIM RUNNING TIME |
|---|---|---|---|
| 1 | OPERATION PROGRAM STORAGE AREA | | |
| 2 | | | |
| 3 | DATA STORAGE AREA USED IN VARIOUS TASKS | 1 | t1 |
| 4 | | 0 | t2 |
| 5 | | 0 | t3 |
| 6 | | 0 | t4 |
| 7 | | 0 | t5 |
| 8 | | 0 | t6 |
| 9 | | 0 | t7 |
| 10 | | 0 | t8 |

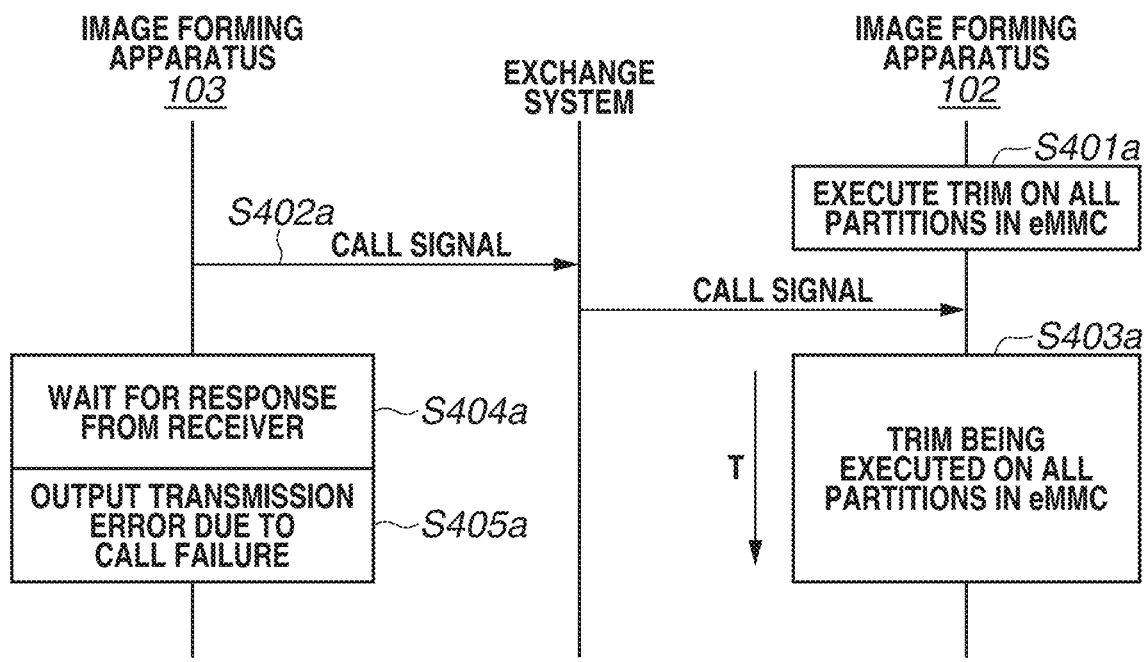
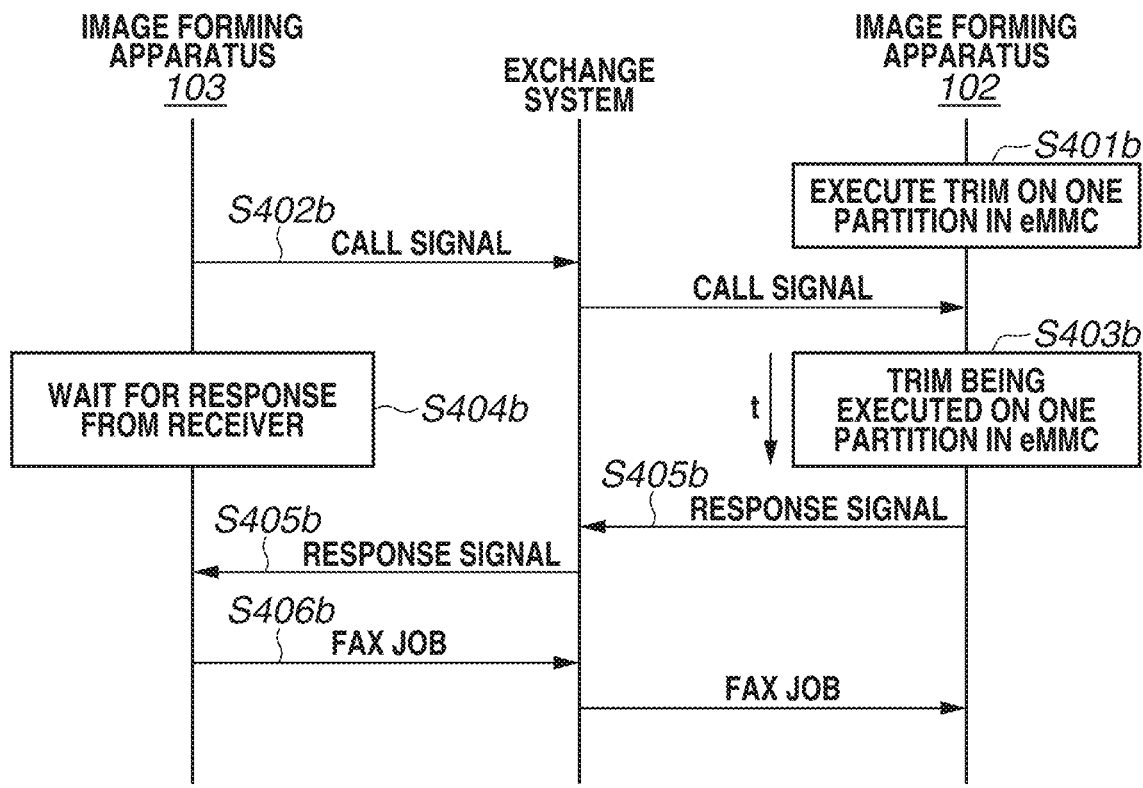

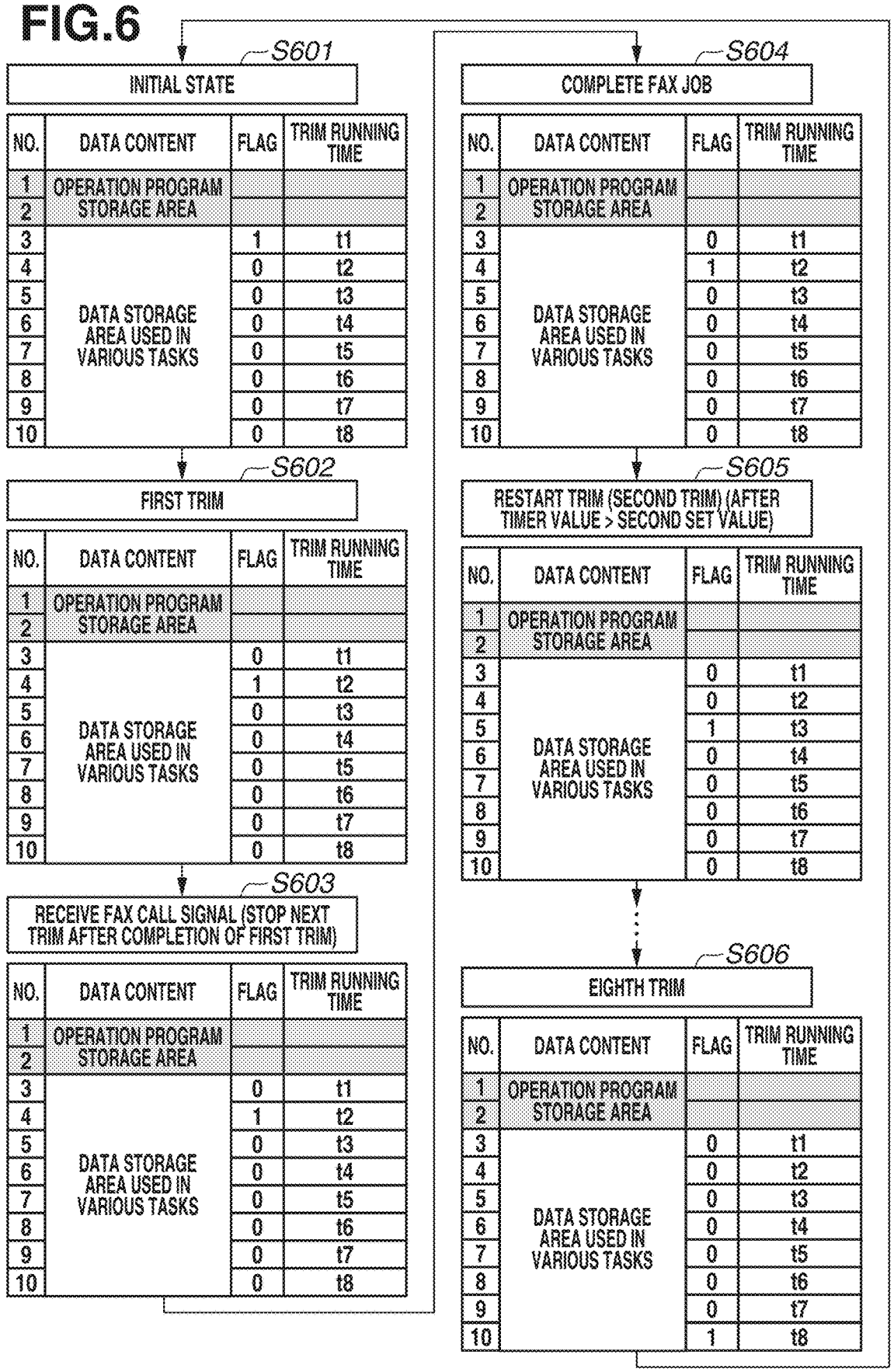

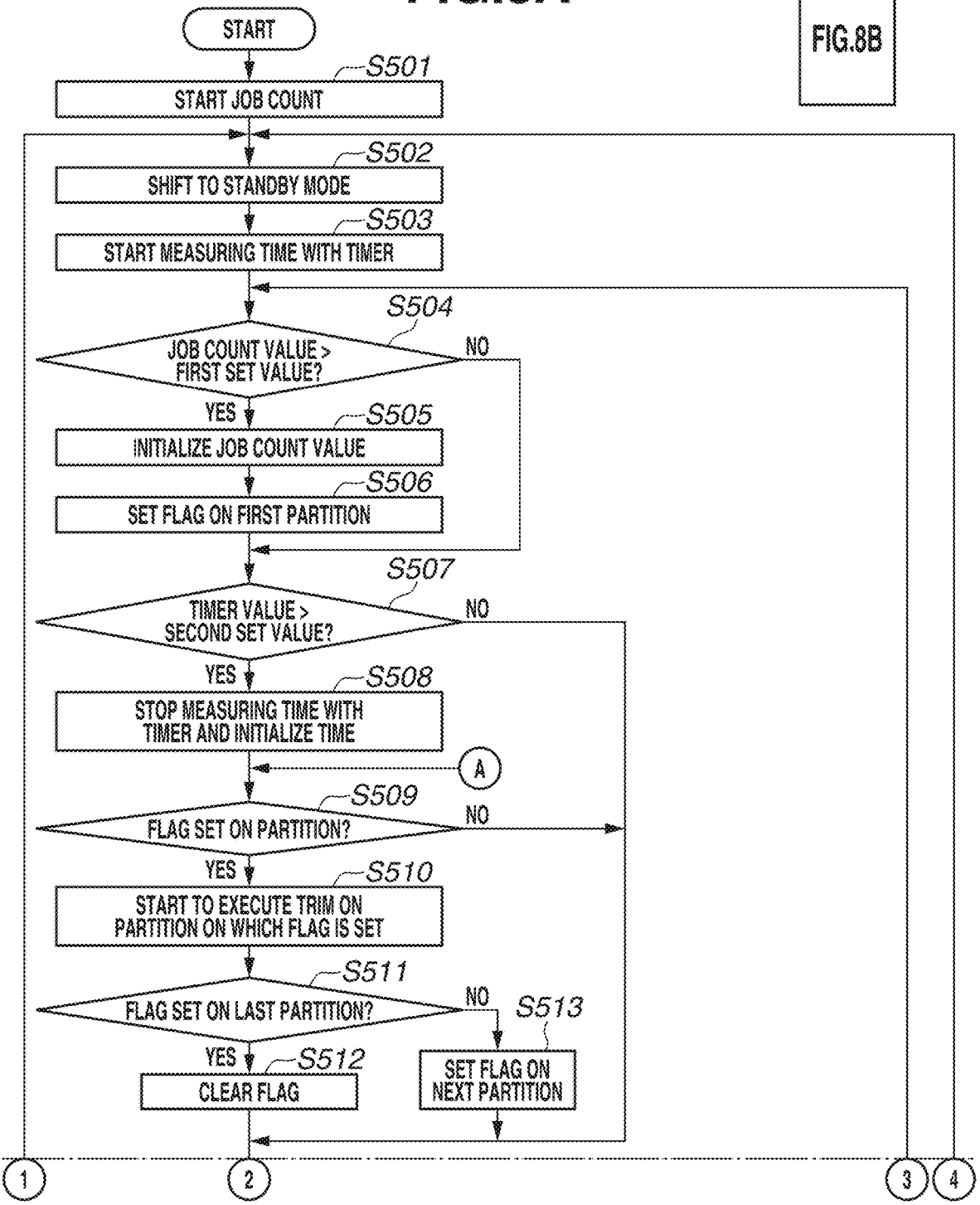

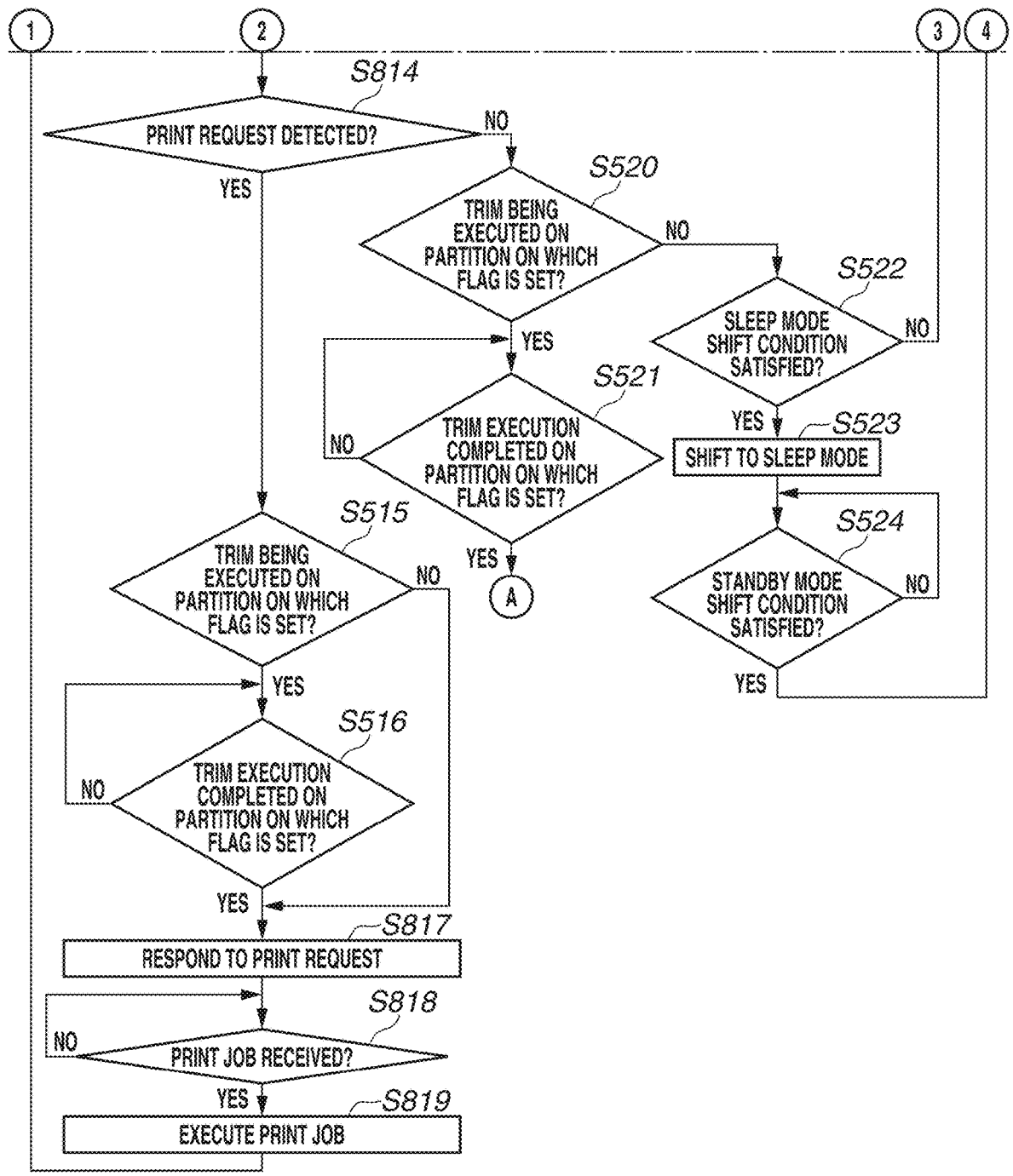

IMAGE FORMING DEVICE PERFORMING TRIM PROCESSING ON STORAGE AREA

BACKGROUND OF THE DISCLOSURE

Field of the Disclosure

The aspect of the embodiments relates to image forming apparatuses and a method of controlling an image forming apparatus.

Description of the Related Art

There are semiconductor storages such as a solid state drive (SSD) and an embedded Multi Media Card (eMMC) for devices that embeds them. Such a semiconductor storage includes a flash memory and a control circuit. These semiconductor storages are superior to hard disk drives (HDD) in terms of access speed, quietness, and other qualities, but the number of rewriting times is limited.

In order to prolong the service life of the flash memory in a semiconductor storage, the controller in the semiconductor storage performs distributed writing referred to as wear leveling. In the wear leveling, writing is performed by blocks with a small number of writing times being selected prior to others. However, block erasing or data copying may occur at the time a block is selected, during wear leveling in an information processing apparatus, resulting in a decrease in the performance (reading and writing) of the semiconductor storage.

Non-volatile semiconductor storages typically perform processing referred to as Trim as a method to prevent deterioration in the performance. A Trim command is a command to notify a storage of a storage area which is no longer used for a file system of an operating system (OS).

Specifically, the Trim command notifies the controller of a semiconductor storage of an area which is no longer used. By recognizing the unused area, the controller just performs wear leveling by collecting areas used (garbage collection), thus reducing an amount of data to be copied, the number of blocks to be used, and also a total number of rewriting times. The notification to a semiconductor storage of areas that are unused by the Trim command eliminates the need for performing wear leveling on the unused areas, preventing the performance of the semiconductor storage from decreasing.

As for an execution timing of the processing by a Trim command, for example, Japanese Patent Application Laid-Open No. 2015-141681 discusses an image forming apparatus that executes a Trim command available for wear leveling in response to a status being determined to indicate job interruption based on an acquired status of a print job.

SUMMARY OF THE DISCLOSURE

According to an aspect of the embodiments, an apparatus includes a nonvolatile semiconductor storage having a semiconductor area and configured to execute erasure processing based on information about a storage area in which unused data is stored in the semiconductor area in a case where the information is received, and a controller having one or more processors which execute instructions stored in one or more memories, the controller being configured to notify the semiconductor storage of the information, cause the semiconductor storage to stop the erasure processing by reception of a signal related to a job while the semiconductor storage is executing the erasure processing, and transmit a response signal for the signal related to the job to the semiconductor storage.

Further features of the disclosure will become apparent from the following description of exemplary embodiments with reference to the attached drawings.

BRIEF DESCRIPTION OF THE DRAWINGS

FIG. 3 illustrates the partition table of an embedded Multi Media Card (eMMC) stored in the image forming apparatus according to the first exemplary embodiment.

FIGS. 4A and 4B illustrate facsimile (fax) job receiving sequential control manners of the image forming apparatus according to the first exemplary embodiment.

FIG. 6 illustrates a procedure of setting a flag in sequence on the partition table according to the first exemplary embodiment.

FIGS. 8A and 8B (FIG. 8) are a flowchart illustrating processing in receiving a print job of the image forming apparatus according to the second exemplary embodiment.

DESCRIPTION OF THE EMBODIMENTS

Various exemplary embodiments of the disclosure will be described in detail below with reference to the attached drawings. The exemplary embodiments below do not restrict the scope of each claim according to the disclosure. Not all of the combinations of the features described in the exemplary embodiments are necessarily essential for the solutions according to the disclosure.

Figure 1:
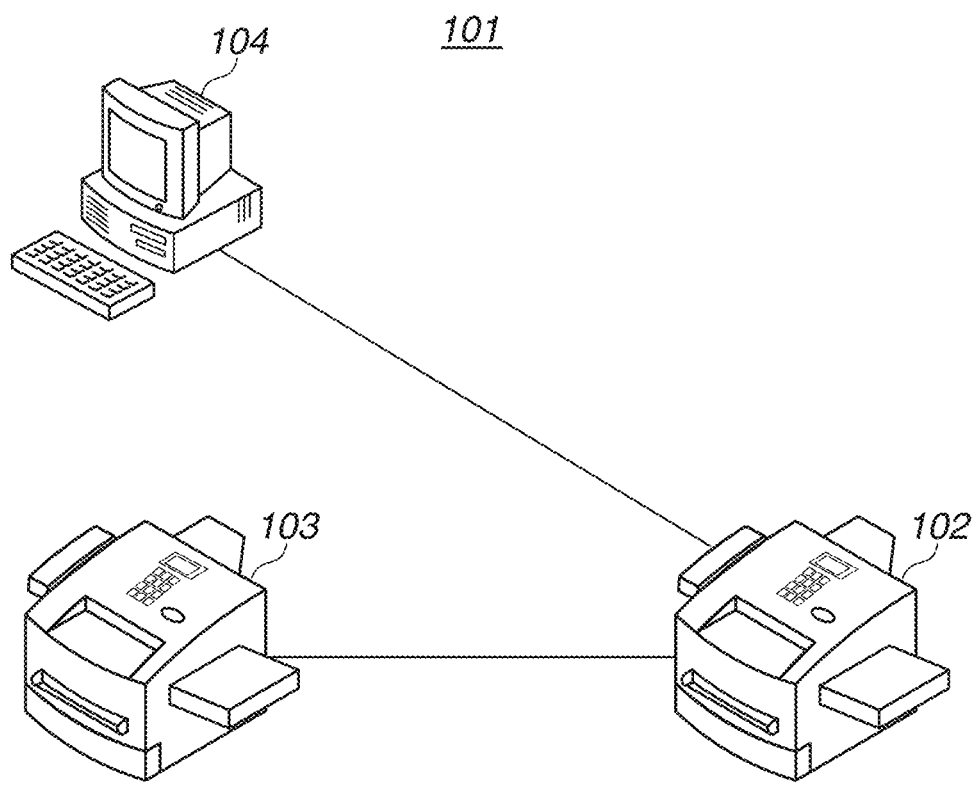
FIG. 1 illustrates the configuration of an image forming system according to a first exemplary embodiment.

FIG. 1 illustrates an example of the configuration of an image forming system according to a first exemplary embodiment.

An image forming system 101 includes image forming apparatuses 102 and 103 and an information processing apparatus 104. The image forming apparatuses 102 and 103 are connected to each other on a telephone line via an exchange system.

The image forming apparatus 102 and the information processing apparatus 104 are connected to each other via a local area network (LAN) cable by way of a network. The image forming apparatus 102 and the information processing apparatus 104 may be directly connected to each other with a Universal Serial Bus (USB) cable. The image forming apparatuses 102 and 103 transmit and receive image data and print the image data on a recording medium by using a fax function.

The information processing apparatus 104 obtains apparatus information on the image forming apparatus 102, generates page description language (PDL) data and print settings, and transmits a print job via the network. The image forming apparatus 102 carries out the print job received from the information processing apparatus 104 and prints an image on a recording medium.

Figure 2:
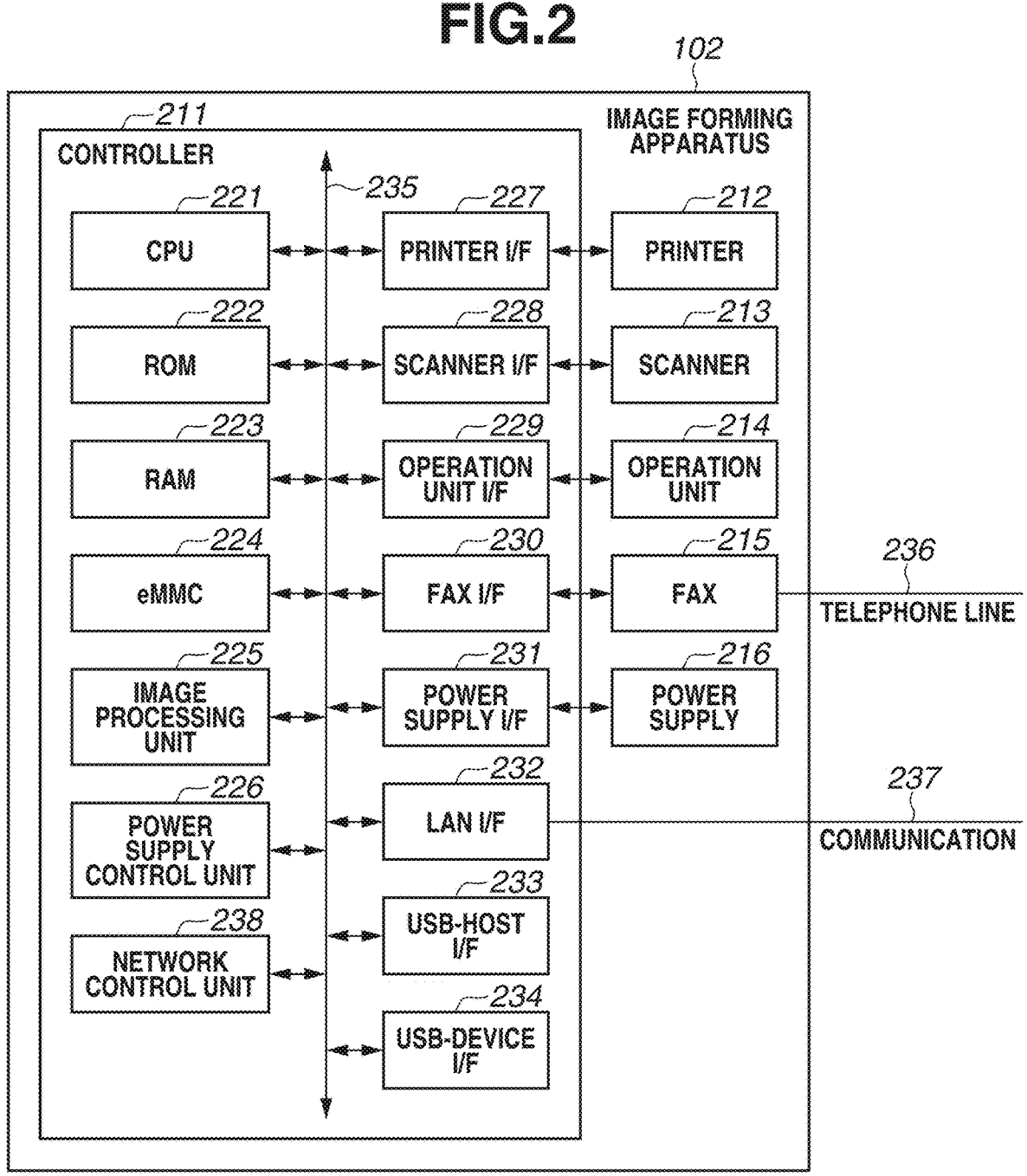
FIG. 2 illustrates the hardware configuration of an image forming apparatus according to the first exemplary embodiment.

FIG. 2 is a block diagram illustrating a hardware configuration of the image forming apparatus 102.

The image forming apparatus 102 includes a controller 211, a printer 212, a scanner 213, an operation unit 214, a fax 215, and a power supply 216. A description of each unit will follow.

The controller 211 includes a central processing unit (CPU) 221, a read-only memory (ROM) 222, a random access memory (RAM) 223, an embedded Multi Media Card (eMMC) 224, an image processing unit 225, a power supply control unit 226, a printer interface (I/F) 227, a scanner I/F 228, and an operation unit I/F 229. The controller 211 further includes a fax I/F 230, a power supply I/F 231, a LAN I/F 232, a USB-host I/F 233, a USB-device I/F 234, and a bus 235.

The CPU 221 controls the whole system and transmits and receives signals to and from each unit via the bus 235. The ROM 222 is a nonvolatile memory which stores a program for the CPU 221 to start the system. The RAM 223 is a volatile memory for the CPU 221 to load and execute various operation programs. The eMMC 224 is a nonvolatile memory which stores fax image data and various programs for the CPU 221 to operate the image forming apparatus 102. The eMMC is described as an example here, but any semiconductor memory (for example, a Solid State Drive (SSD)) that supports a Trim command may be used.

The image processing unit 225 converts read image data received from the scanner 213 and image data received from an external device via the fax I/F 230, the LAN I/F 232, the USB-host I/F 233, or the USB-device I/F 234 into print image data.

The power supply control unit 226 controls power supply to each unit based on what operation mode the image forming apparatus 102 operates in. The image forming apparatus 102 is provided with a standby mode (a standby state) and a sleep mode (a sleep state) as operation modes.

The standby mode is a state in which initial settings of the image forming apparatus 102 in hardware and software are completely set after the power is turned on or a state in which the next job can be received from a user after the completion of a job (a state in which the next job can be executed).

In the standby mode, the image forming apparatus 102 is in a state where at least the initial settings have been set and power has been supplied to the CPU 221 and the eMMC 224. This means that power supply to a part or the entirety of each block may be shut off to an extent that the shutoff will not affect the receipt and execution of a job in the standby mode.

For example, in a case where an initial setting of the scanner I/F 228 takes some time, power supply to a part of an automatic document feeder (ADF) and to a part of a reader unit (both are not illustrated) may be shut off, the parts being parts that do not require the initial setting, while power is supplied to the scanner I/F 228. Alternatively, for example, a backlight of a display unit 107 (not illustrated) may be turned off to reduce power consumption of the display unit 107.

The sleep mode is a mode to consume less power to the image forming apparatus 102 than the standby mode. The sleep mode stops partial operation of the CPU 221 together with the operation of a part or the entirety of each module such as the operation unit 214, the printer I/F 227, and the printer 212 in order to reduce the power consumption of the image forming apparatus 102.

A sleep mode shift condition is a condition of a fixed lapse of an auto sleep time or the detection of a press of a power saving key. A user can set auto sleep time freely based on the product specifications.

A standby mode shift condition is a condition of the detection of an input on the operation unit 214, the detection of a document by the scanner 213, or the detection of reception of a job by an external I/F such as the fax I/F 230, the LAN I/F 232, the USB-host I/F 233, and the USB-device I/F 234.

The printer I/F 227 is connected to the printer 212, and transmits and receives control signals related to the transmission of print image data and print operation. The scanner I/F 228 is connected to the scanner 213, and transmits and receives control signals related to the reception of read image data and reading operation. The operation unit I/F 229 is connected to the operation unit 214, selects various function keys received via the operation unit 214, executes and stops jobs, receives input signals of turning on or off with a power supply key, and transmits display image data.

The fax I/F 230 is connected to the fax 215, and transmits and receives control signals related to image data and fax operation. The power supply I/F 231 is connected to the power supply 216, and transmits control signals of output voltages according to the operation mode of the image forming apparatus 102.

The LAN I/F 232 is connected to the network, receives print jobs and image data from a plurality of external devices such as a personal computer (PC) connected to the network. The USB-host I/F 233 is connected to an external device such as a USB memory, and transmits and receives image data and other data. The USB-device I/F 234 is connected to an external device such as a PC and receives print jobs and image data from the external device.

The printer 212 performs the print operation of receiving print image data, transmitting and receiving control signals related to the print operation, charging and exposing a photosensitive drum, developing with toner, and transferring and fixing to a recording medium.

The scanner 213 reads a document, generates and transmits the read image data, transmits and receives control signals related to reading operation, and transmits a signal of restoration from a sleep mode upon detection of a document.

The operation unit 214 selects various function keys, executes and stops a job, receives input signals turning of on and off with the power supply key, and receives and displays display image data.

The fax 215 performs the processing of modulation, demodulation, transmission and reception of image data via a telephone line 236, and detection of a call signal through the telephone line 236 and then connection to a telephone or modulation and demodulation units.

The power supply 216 performs analog/digital (A/D) conversion of an input power supply and controls the output voltage according to the received control signal.

A network control unit 238 connects the LAN I/F 232 to an external terminal in communication 237 and performs network communications. Either wireless or wired communications may be provided.

FIG. 3 illustrates a partition table of the eMMC included in the image forming apparatus according to the first exemplary embodiment.

The CPU 221 divides a storage area of the eMMC 224 into a plurality of areas and controls each partition by a number. A designer can define the number of partitions and how much storage capacity each partition has.

Divided partitions prevent data erasure that may occur by multiple applications writing data on a storage area while a plurality of applications are writing data on the eMMC 224. Specifically, each application is assigned an upper limit and a lower limit in the range of accessible address values in a semiconductor area (hereinbelow, a storage area) in the eMMC 224 so that more than one application does not share an overlapping range of address values. The upper limit and the lower limit may be defined based on the start address of an accessible storage area and a data amount from the start address.

In addition, the CPU 221 may store a table listing fixed values representing a range of address values above to which each application can access. Alternatively, the CPU 221 may store variable values which are varied according to an operation rate of each application in a file management system (not illustrated) included in the CPU 221. According to the present exemplary embodiment, it is assumed here that the storage area is divided into ten areas. The CPU 221 stores fixed values of upper and lower limit values of an address value range of each divided storage area (a divided area) and a Trim execution flag of each storage area described below in the partition table illustrated in FIG. 3.

A Trim command (Trim processing) is a command for notifying the eMMC 224 of a storage block that has become unused for a file system of the CPU 221.

Specifically, a Trim command notifies the controller in the semiconductor storage of an area that has become unused. The storage device controller (not illustrated) recognizes the unused areas, collects blocks used (garbage collection), and performs wear leveling. Trim processing described here is wear levelling performed by the storage (not illustrated) based on a notification to a storage of an area that has become unused by the CPU 221. Trim processing will reduce an amount of data to be copied, the number of blocks to be used, and a total number of rewriting times. Thus, the notification to the eMMC 224 of unused storage blocks by a Trim command makes it possible not to perform wear levelling even on unused areas to reduce the decrease in the performance of the eMMC 224.

Trim processing takes longer time to run on a partition with a larger storage capacity. Trim processing subject to the all areas of the eMMC 224 will result in a longer period the CPU 221 executes the Trim processing for. The time it takes to execute Trim processing depends on the storage capacity of the eMMC 224. For example, it may take several tens seconds on an eMMC with several gigabytes of storage capacity, and longer time on an SSD.

However, the notification of unused storage areas by a Trim command occupies the resource of the CPU 221, affecting other application operations on the CPU 221. In that case, a Trim command will be issued as long as the running time of the Trim command does not affect the operation by the user, even though the resource of the CPU 221 is occupied longer. This can hinder the issuance of a Trim command. In order to avoid the situation, in one embodiment, Trim commands are issued in sequence for respective divided storage areas in the eMMC 224. This reduces the time one TRIM command issuance occupies the resource of the CPU 221 for, relaxing the condition to issue a Trim command.

How much time to take to run one Trim command depends on the storage capacity per divided storage area. Hence it will take a shorter time to occupy the resource of the CPU 221 on a finely divided area. In one embodiment, the storage area is to be divided into partitions so that the CPU 221 processing time for one Trim command may be a minimum time (e.g. approximately seven seconds) the one Trim command performs processing on one partition for.

In addition, for example, if Trim commands are to be issued to the partition of number 3 and the partition of number 4 in the eMMC 224, the CPU 221 will first issue a Trim command to the partition of number 3. After the Trim processing performed on the partition of number 3 completes, the CPU 221 issues a Trim command to the partition of number 4.

The partition table illustrated in FIG. 3 is stored that lists data content stored in each partition, a flag for recording a Trim execution target, and running time for the Trim processing. The partitions of numbers 1 and 2 correspond to operation program storage areas to which write protection is applied and are not subject to Trim execution. The partitions of numbers 3 to 10 correspond to data storage areas used in various tasks and are subject to Trim execution. 1 is set to the partition subject to Trim execution as a flag; otherwise, 0 is set.

FIGS. 4A and 4B illustrate fax job receiving sequential control manners on image forming apparatuses according to the first exemplary embodiment. FIG. 4A illustrates a comparative example with an issue, and FIG. 4B illustrates a configuration according to the present exemplary embodiment. The image forming apparatuses 103 and 102 exchange signals via the exchange system, but a description thereof is omitted here.

FIG. 4A illustrates a conventional fax job receiving sequential control manner in Trim execution. Conventionally, a Trim command is collectively executed on all of the data storage areas of the eMMC 224. This prevents a fax job from being executed until the Trim processing completes on all of the data storage areas.

In step S401*a*, the CPU 221 executes the Trim processing on all of the partitions of the eMMC 224.

In step S402*a*, the image forming apparatus 103 transmits a call signal to a receiver. Then, as illustrated in step S404*a*, the image forming apparatus 103 waits for a response from the receiver until a response waiting time set in advance is exceeded (a response waiting status).

In step S403*a*, the image forming apparatus 102 receives the call signal. However, the Trim processing being executed, the image forming apparatus 102 is prevented from returning a response until the Trim processing completes.

Time T during which the image forming apparatus 102 is prevented from responding is expressed by the following expression (1), where to (n=1, 2, ... and 8) indicated in FIG. 3 is a Trim running time.

$$T<=\Sigma(tn) \qquad \text{Expression (1)}$$

In step S405*a*, if a response has not been received even after the response waiting time set in advance is exceeded, the image forming apparatus 103 outputs a transmission error due to a call failure.

The response waiting time varies depending on the product specifications of the image forming apparatus 103, but it is assumed that the response waiting time set in advance is approximately 30 seconds. In other words, for the Trim running time on the eMMC 224 in the image forming apparatus 102 to exceed 30 seconds, the image forming apparatus 102 cannot transmits a response within the response waiting time set in advance of the image forming apparatus 103 depending on a timing at which a fax job is received. This could create a possibility of a transmission error due to the call failure issued by the image forming apparatus 103.

Next, FIG. 4B illustrates a configuration according to the present exemplary embodiment. FIG. 4B illustrates a fax job receiving sequential control manner. The sequential control is executed so that the image forming apparatus 102 stops the Trim processing in response to the Trim processing on the current partition being completed, and responds to a fax job which is received during execution of a Trim command on a plurality of partitions of data storage areas in the eMMC 224.

In step S401b, the CPU 221 executes a Trim command on one of the divided partitions of the eMMC 224.

In step S402b, the image forming apparatus 103 transmits a call signal to the receiver. Then, as illustrated in step S404b, the image forming apparatus 103 waits for a response from the receiver until the response waiting time set in advance is exceeded (a response waiting status).

In step S403b, the image forming apparatus 102 receives the call signal. However, the Trim command is being executed, so that the image forming apparatus 102 cannot return a response until the Trim processing completes.

The time during which the image forming apparatus 102 cannot respond equals tn (n=1, 2, . . . and 8), and each partition is set so that the corresponding tn is sufficiently shorter than the response waiting time set in advance of the image forming apparatus 103. Assuming that the waiting time is approximately 30 seconds, the running time for Trim processing on each partition in the eMMC is approximately tn<10 seconds. During that running time, Trim processing on each area completes within the response waiting time of the image forming apparatus 103. Then, upon completion of the Trim command execution on the current partition, the Trim processing on the other partitions is stopped.

In step S405b, the image forming apparatus 102 transmits a response signal to the image forming apparatus 103. In step S406b, the image forming apparatus 103 receives the response signal within the response waiting time, and transmits a fax job to the image forming apparatus 102.

As described above, Trim processing on a partition on which the Trip command has not been executed is stopped in response to completion of the Trip processing on the current partition at the timing a call signal is received, and then a response to the call signal is returned. This prevents a fax job from being cancelled, keeping convenience for the user.

Next, the present exemplary embodiment is described in detail with reference to a flowchart for processing at a time of receiving a fax job in FIG. 5 including FIGS. 5A and 5B. The eMMC 224 stores a program to execute the processing according to the flowchart in FIGS. 5A and 5B. The program is loaded into the RAM 223, and is executed by the CPU 221.

In step S501, the CPU 221 starts a job counter counting that adds one count for a job carried out using the eMMC 224, such as printing and reading. In step S502, the image forming apparatus 102 shifts to the standby mode.

In step S503, the CPU 221 starts measuring time with a timer. In step S504, the CPU 221 determines whether a value of the job count in step S501 exceeds a first set value and checks an amount available of the eMMC 224 for writing. With a value not exceeding the first set value (NO in step S504), the CPU 221 advances the processing to step S507. Otherwise (YES in step S504), the CPU 221 advances the processing to step S505. In step S505, the CPU 221 initializes the job count value. Then, in step S506, the CPU 221 stores 1 in (sets a flag) the first partition of the eMMC 224. The partition that stores 1 becomes subject to Trim execution.

In step S507, the CPU 221 determines whether a predetermined time has elapsed by comparing a timer value and a second set value. If the predetermined time has not elapsed (NO in step S507), the CPU 221 advances the processing to step S514. If the predetermined time has elapsed (YES in step S507), the CPU 221 advances the processing to step S508.

In step S508, the CPU 221 stops measuring time with the timer and initializes the presented time. In step S509, the CPU 221 determines whether there is a partition on which the flag is set to 1 in the partitions in FIG. 3. If there is no partition on which the flag is set to 1 (NO in step S509), the CPU 221 advances the processing to step S514.

If there is a partition on which the flag is set to 1 (YES in step S509), the CPU 221 advances the processing to step S510. In step S510, the CPU 221 starts to execute a Trim command on the partition on which the flag is set. After the Trim processing is complete, the CPU 221 advances the processing to step S511.

In step S511, the CPU 221 determines whether the flag is set to 1 on the last partition. If the flag is set to 1 (YES in step S511), then in step S512, the CPU 221 sets the flag to 0. That means that the Trim command is executed on all the individual areas that are a plurality of partitions. When the processing in step S512 finishes, the CPU 221 advances the processing to step S514.

In step S511, if the flag is not set to 1 on the last partition (NO in step S511), then in step S513, the flag set to 1 is set to 0 and the flag of the next partition number is set to 1. This makes the area of the next partition number subject to Trim execution. If the processing in step S513 finishes, the CPU 221 advances the processing to step S514.

In step S514, the CPU 221 determines whether a call signal through a line is detected. Specifically, if the CPU 221 has no interrupt port that has received an interrupt of a call signal through a fax line (NO in step S514), the CPU 221 advances the processing to step S520. In step S520, the CPU 221 determines whether a Trim command is being executed on the partition on which the flag is set to 1. If a Trim command is being executed (YES in step S520), then in step S521, the CPU 221 will be waiting until the Trim execution finishes. The CPU 221 receives a notification of completion of the Trim execution from the eMMC 224 (YES in step S521) and then returns the processing to step S509.

In step S520, if a Trim command is not being executed on the partition on which the flag is set to 1 (NO in step S520), the CPU 221 advances the processing to step S522. In step S522, the CPU 221 determines whether the sleep mode shift condition is satisfied. If not (NO in step S522), the CPU 221 returns the processing to step S504. If satisfied (YES in step S522), then in step S523, the CPU 221 shifts the image forming apparatus 102 to the sleep mode. When the processing in step S523 finishes, the CPU 221 advances the processing to step S524. In step S524, the CPU 221 is waiting until the standby mode shift condition is satisfied. When satisfied (YES in step S524), the CPU 221 returns the processing to step S502.

The description will continue returning to the processing of step S514. In step S514, if the CPU 221 detects a call signal through the line (YES in step S514), the CPU 221 advances the processing to step S515. Specifically, if the CPU 221 has an interrupt port that has received an interrupt of the call signal through the fax line (YES in step S514), the CPU 221 advances the processing to step S515.

In step S515, the CPU 221 determines whether a Trim command is being executed on the partition on which the flag is set to 1. If a Trim is not being executed (NO in step S515), the CPU 221 advances the processing to step S517. If a Trim command is being executed (YES in step S515), then in step S516, the CPU 221 will be waiting until the Trim execution completes. In step S516, the CPU 221 receives a notification of the completion of the Trim execution from the eMMC 224 (YES in step S516), and then advances the processing to step S517.

In step S517, the CPU 221 responds to the call signal through the line. In step S518, the CPU 221 is waiting for receiving a fax job. If the CPU 221 receives the fax job (YES in step S518), then in step S519, the CPU 221 executes the fax job and returns the processing to step S502.

FIG. 6 illustrates a procedure of setting a flag in sequence on the partition table of the eMMC 224 according to the first exemplary embodiment.

Step S601 indicates an initial state of the partition table of the eMMC 224 in which the flag is set to 1 in the partition number 3 as a Trim execution target, and in which the flags of the other partition numbers are set to 0.

If the timer value exceeds the second set value, the CPU 221 executes a Trim command on the partition of number 3 (the first Trim execution).

Step S602 indicates a state of the partition table of the eMMC 224 after the first Trim execution (started) in which the flag of the partition number 3 is set to 0, and in which the flag of the next partition number 4 is set to 1.

In step S603, the CPU 221 receives a fax call signal before completion of the first Trim execution. This event causes the Trim execution to be not continued on the partition of number 4 (Trim execution stop) even after the Trip execution on the partition of number 3 completes. The CPU 221 responds to the call signal of a fax job and executes the fax job upon reception of fax data in response to the completion of the Trim execution on the partition of number 3.

In step S604, the fax job completes. At that time, the partition table is not changed from that of step S602. In response to the completion of the fax job, the CPU 221 enters the standby state again. If the timer value exceeds the second set value again, in step S605, the CPU 221 executes a Trim command on the partition of number 4 (restart of Trim processing) (the second Trim). Step S605 indicates a state of the partition table of the eMMC 224 in execution of the second Trim command in which the flag of the partition number 4 is set to 0, and in which the flag of the next partition number 5 is set to 1.

If the Trim execution on the partition of number 4 completes without an interrupt of a call signal, the CPU 221 starts a Trim execution on the partition of number 5. Step S606 indicates a state after the above-described processing is repeated. In step S606, the partition table of the eMMC 224 is in execution of the eighth Trim command in which the flag of the partition number 9 is set to 0, and in which the flag of the next partition number 10 is set to 1. When a Trim command is executed next time (when the job count value exceeds the first set value and the flag is newly set), the processing of the procedure returns to step S601.

According to the present exemplary embodiment, even for a detection of a call signal through a telephone line while an image forming apparatus is executing a Trim command on an eMMC, the image forming apparatus can complete the Trim processing within a predetermined call period and respond to the call signal. In other words, the image forming apparatus can perform both Trim processing on an eMMC and the response to a call signal through a telephone line in a standby mode, enhancing convenience for the user.

A second exemplary embodiment is described. FIGS. 7A, 7B to 9 illustrate an information processing apparatus according to the present exemplary embodiment. According to the present exemplary embodiment, the processing and the steps similar to those in FIGS. 4A, 4B, and 5 are denoted by the same reference numerals, and the descriptions thereof are omitted. Further, in the present exemplary embodiment, the configurations illustrated in FIGS. 1 to 3 are similar to those according to the first exemplary embodiment, and the descriptions thereof are omitted.

Figure 7A:
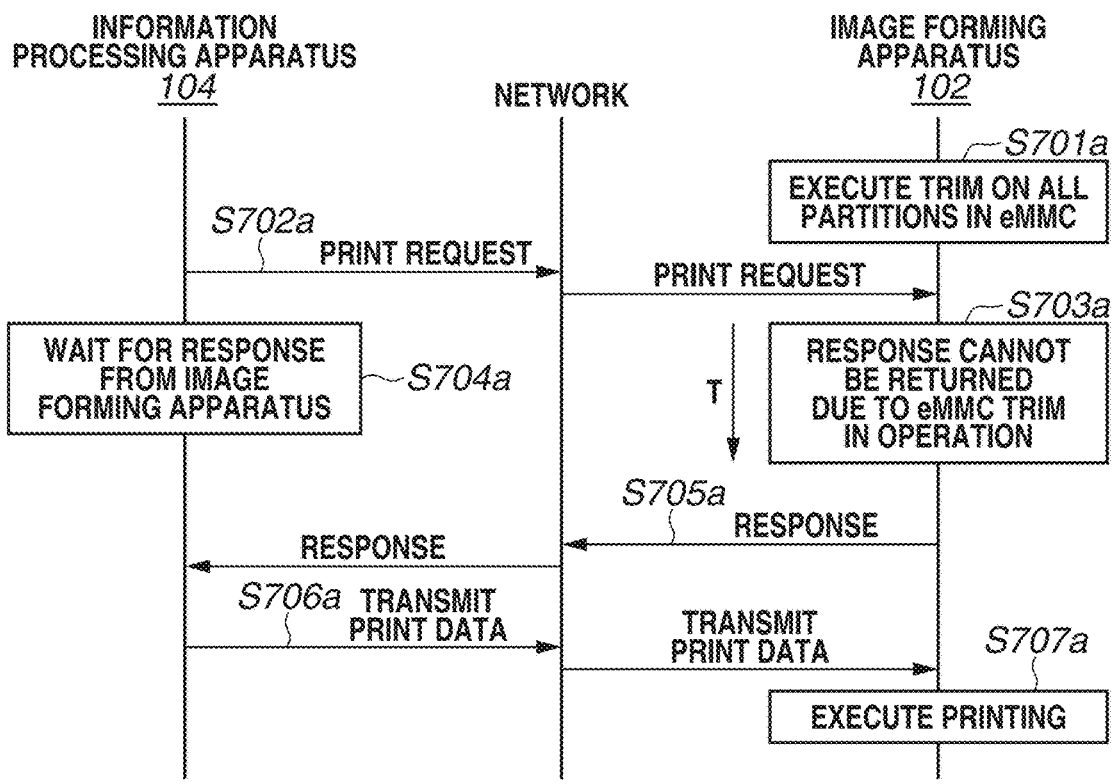
FIGS. 7A and 7B illustrate print job receiving sequential control manners of an image forming apparatus according to a second exemplary embodiment.
Figure 7B:
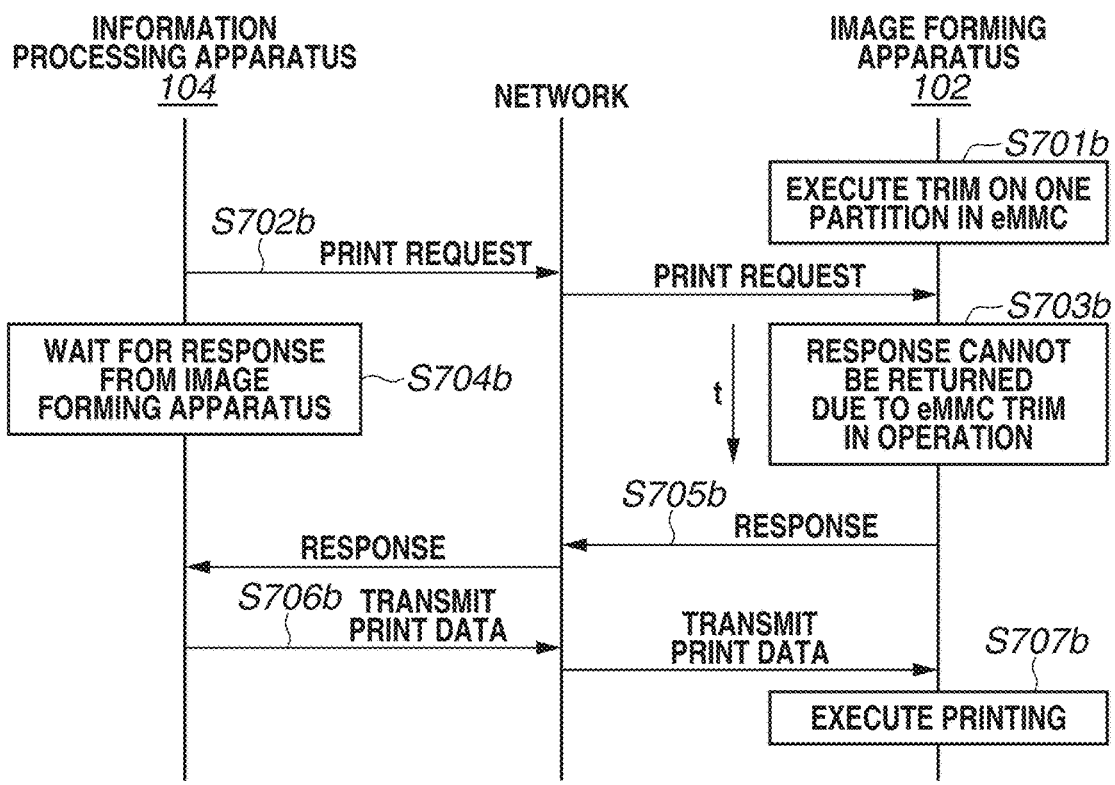

FIGS. 7A and 7B illustrate print job receiving sequential control manners of the image forming apparatus according to the second exemplary embodiment. FIG. 7A illustrates a conventional configuration as a comparative example, and FIG. 7B illustrates a configuration according to the present exemplary embodiment. The information processing apparatus 104 and the image forming apparatus 102 exchange signals via the network, but the description thereof is omitted here.

FIG. 7A illustrates a conventional print job receiving sequential control manners in Trim command execution. Conventionally, a Trim command is collectively executed on all of the data storage areas in the eMMC 224. This prevents a print job from being executed until the Trim execution completes on all of the data storage areas.

In step S701a, the CPU 221 executes Trim processing on all the partitions of the eMMC 224.

In step S702a, the information processing apparatus 104 transmits a print request to the image forming apparatus 102. Then, as illustrated in step S704a, the information processing apparatus 104 waits for a response from the image forming apparatus 102 (the response waiting state).

In step S703a, the image forming apparatus 102 receives the print request. However, the Trim processing being executed, the image forming apparatus 102 is prevented from returning a response until the Trim execution completes. The time during which the image forming apparatus 102 is prevented from responding is expressed by the above-described expression (1).

In step S705a, when the Trim execution on all the partitions completes, the image forming apparatus 102 returns a response to the print request received in step S702a to the information processing apparatus 104.

In step S706a, upon receiving the response from the image forming apparatus 102, the information processing apparatus 104 transmits print data to the image forming apparatus 102. In step S707a, the image forming apparatus 102 receives the print data and executes printing.

In other words, according to the conventional example, even if the information processing apparatus 104 transmits a print job while the image forming apparatus 102 is executing the Trim command, the print job is not executed until the Trim execution on all the partitions completes, keeping the user waiting for a long time.

Next, FIG. 7B illustrates a configuration according to the present exemplary embodiment. FIG. 7B illustrates print job receiving sequential control manner. The job receiving sequential control is executed so that the image forming apparatus 102 stops the Trim processing in response to the Trim processing on the current partition being completed, and responds to the print job where a print job is received in execution of a Trim command on one of the partitions of data storage areas in the eMMC 224.

In step S701b, the CPU 221 executes a Trim command on one of the divided partitions of the eMMC 224.

In step S702b, the information processing apparatus 104 transmits a print request to the image forming apparatus 102. Then, as illustrated in step S704b, the information processing apparatus 104 waits for a response from the image forming apparatus 102 until the response waiting time set in advance is exceeded (the response waiting state).

In step S703b, the image forming apparatus 102 receives the print request. However, the Trim command being executed, the image forming apparatus 102 is prevented from returning a response until the Trim execution completes.

However, each partition is set so that the time during which the image forming apparatus 102 cannot respond until the Trim being executed on the partition of the divided partitions completes is sufficiently short. Then, upon completion of the Trim being executed on the partition, the Trim processing on the other partitions is stopped.

In step S705b, the image forming apparatus 102 transmits a response signal to the information processing apparatus 104. In step S706b, the information processing apparatus 104 receives the response signal, and transmits print data (a print job) to the image forming apparatus 102.

As described above, Trim processing on a partition on which the Trip command has not been executed is stopped in response to completion of the Trip processing on the partition with a print request received, and then a response to the print request is returned. This reduces the period that the user will be waiting for, keeping convenience for the user.

Next, the present exemplary embodiment is described in detail with reference to a flowchart for processing in receiving a print job in FIG. 8 including FIGS. 8A and 8B. The eMMC 224 stores a program for executing the processing according to the flowchart in FIGS. 8A and 8B. The program is loaded into the RAM 223, and is executed by the CPU 221. In FIGS. 8A and 8B, the steps similar to those in FIGS. 5A and 5B are denoted by the same numbers, and the descriptions thereof are omitted.

When the processing in steps S512 and S513 completes, the CPU 221 advances the processing to step S814. In step S814, the CPU 221 determines whether a print request is detected from the network. Specifically, if the CPU 221 has no interrupt port that has received an interrupt of a print request (NO in step S814), the CPU 221 advances the processing to step S520. In step S814, if the CPU 221 detects a print request from the network (YES in step S814), the CPU 221 advances the processing to step S515. Specifically, if the CPU 221 has an interrupt port that has received an interrupt of the print request (YES in step S814), the CPU 221 advances the processing to step S515.

In step S515, the CPU 221 determines whether a Trim command is being executed on the partition of which the flag is set to 1. If a Trim command is not being executed (NO in step S515), the CPU 221 advances the processing to step S817. If the Trim command is being executed (YES in step S515), then in step S516, the CPU 221 will be waiting until the Trim execution completes. In step S516, the CPU 221 receives a notification of the completion of the Trim execution from the eMMC 224 (YES in step S516), and then advances the processing to step S817.

In step S817, the CPU 221 responds to the print request of the print data from the network. In step S818, the CPU 221 is waiting for receiving the print data. In step S818, if the CPU 221 receives the print data (YES in step S818), then in step S819, the CPU 221 executes the print job and returns the processing to step S502.

Figure 9:
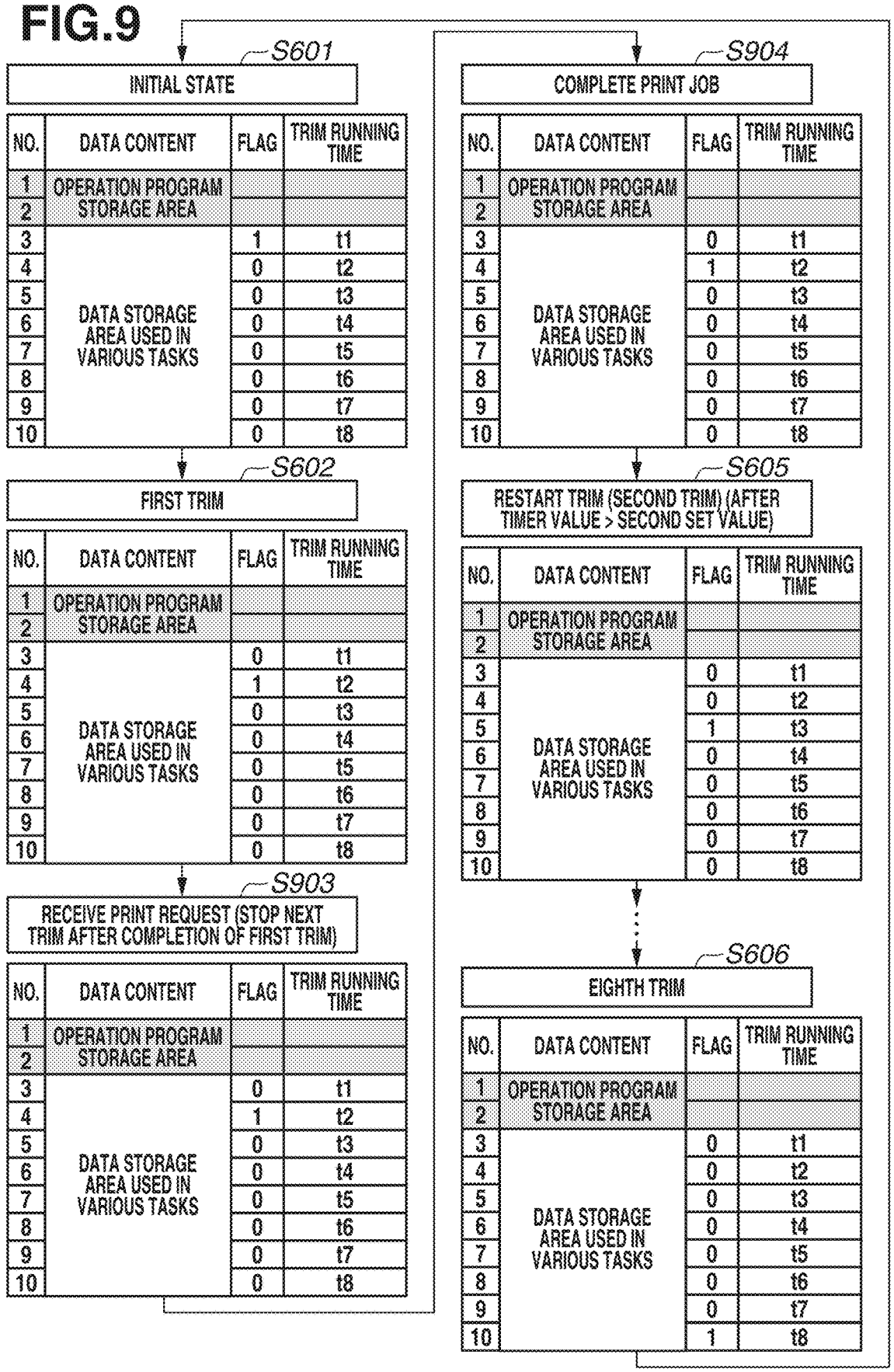
FIG. 9 illustrates a procedure of setting a flag in sequence on a partition table according to the second exemplary embodiment.

FIG. 9 illustrates a procedure of setting a flag in sequence on a partition table of the eMMC 224 according to the second exemplary embodiment. In FIG. 9, the steps similar to those in FIG. 6 are denoted by the same numbers, and the descriptions thereof are omitted.

In step S903, the CPU 221 receives a print request before completion of the first Trim execution. This prevents the Trim command from being continuously executed on the partition of number 4 (the Trim stop) even after the completion of the Trim execution on the partition of number 3. Then, when the Trim execution on the partition of number 3 completes, the CPU 221 responds to the print request and executes the print job upon reception of the print data.

In step S904, the print job completes. At that time, the partition table is not changed from that of step S602. In response to the completion of the print job, the CPU 221 enters the standby state again. If the timer value exceeds the second set value again, in step S605, the CPU 221 executes a Trim command on the partition of number 4 (restart of the Trim) (the second Trim). Step S605 indicates the state of the partition table of the eMMC 224 in execution of the second Trim in which the flag of the partition of number 4 is set to 0, and in which the flag of the next partition of number 5 is set to 1.

If the Trim execution on the partition of number 4 completes without an interrupt of a print request, the CPU 221 continuously starts a Trim execution on the partition of number 5. Step S606 indicates the state after the above-described processing is repeated. The following description is omitted.

According to the present exemplary embodiment, with a print request of a print job received during execution of a Trim command on the eMMC, the image forming apparatus can shorten a waiting time until completion of the print job. In other words, the image forming apparatus can perform both Trim processing on the eMMC and the response to a print job request in the standby mode, enhancing convenience for the user.

A third exemplary embodiment will be described. According to the present exemplary embodiment, the total Trim running time from the partition in the middle of execution of a Trim command through the last partition is calculated in response to reception of a print request. Subsequently, if the total Trim running time is a predetermined value or lower, the Trim processing continues to be performed until the Trim processing on the last partition finishes, with emphasis placed on improvement of eMMC data transfer rate.

Figures 10, 10A:
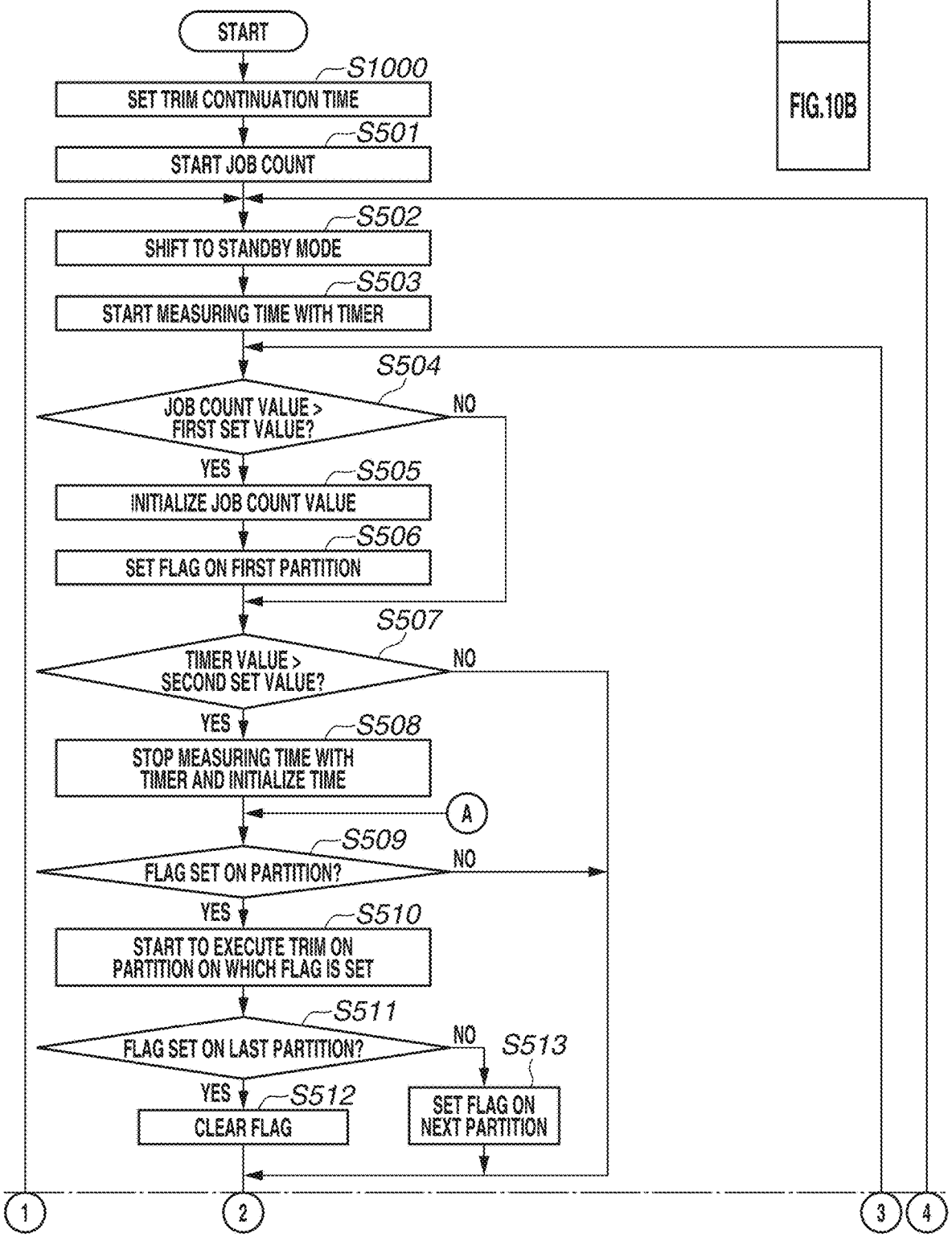
FIGS. 10A and 10B (FIG. 10) are a flowchart illustrating processing in receiving a print job of an image forming apparatus according to a third exemplary embodiment.
Figure 10B:
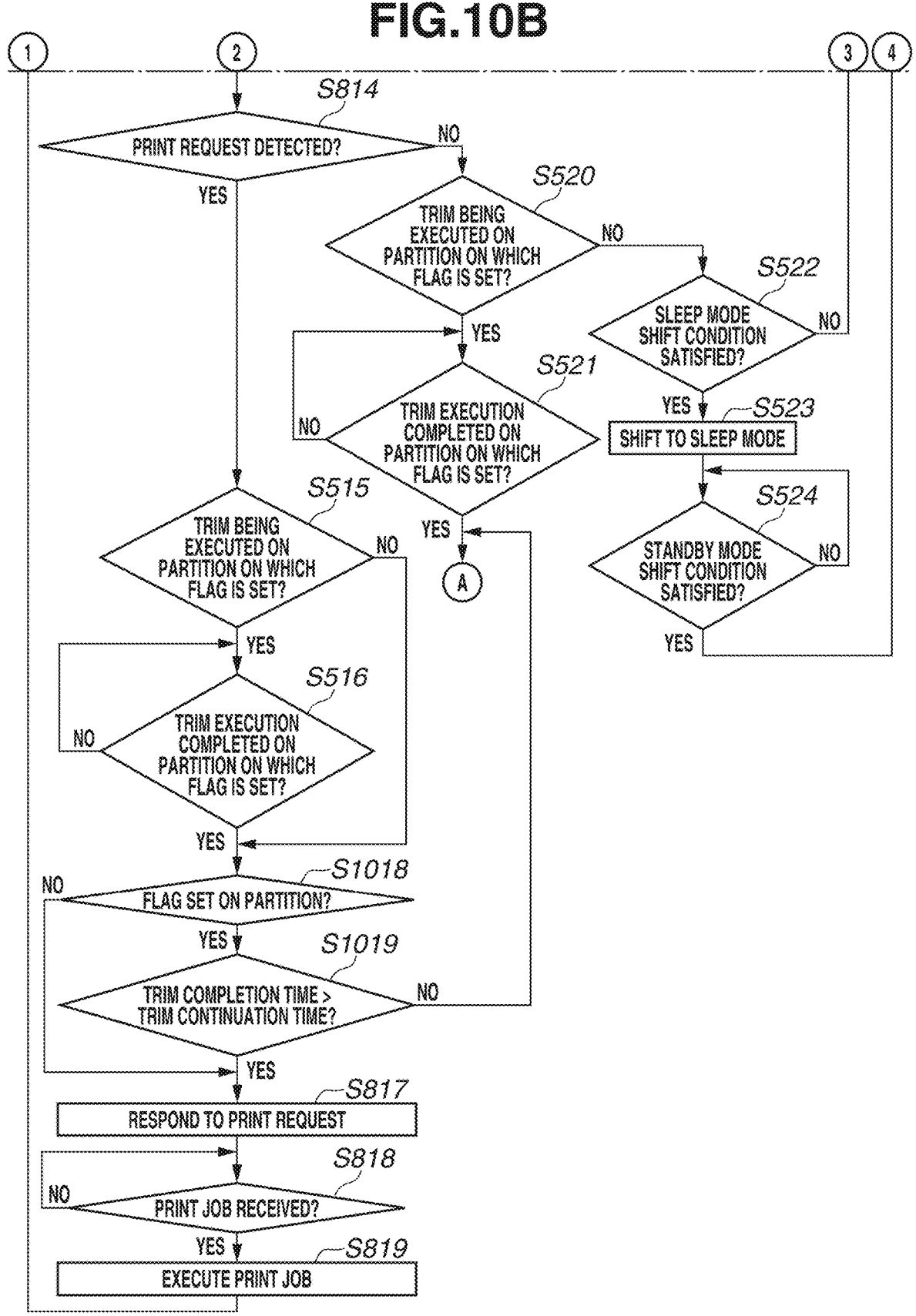

An information processing apparatus according to the present exemplary embodiment is described with reference to FIG. 10 including FIGS. 10A and 10B. According to the present exemplary embodiment, the processing and the steps similar to those in FIGS. 8A and 8B are denoted by the same reference numerals, and the descriptions thereof are omitted. Further, according to the present exemplary embodiment, the configurations illustrated in FIGS. 1 to 3 are similar to those according to the first exemplary embodiment, and the processing illustrated in FIGS. 7A, 7B, and 9 are similar to those according to the second exemplary embodiment, and thus the descriptions thereof are omitted.

In step S1000, the CPU 221 sets Trim continuation time. The Trim continuation time is a value set for the determination that the Trim command continues to be executed without an interruption, on the total Trim running time from the partition in the middle of execution of the Trim command through the last partition that is Trim continuation time or lower in response to a print request being received during execution of a Trim command. If the processing in step S1000 finishes, the CPU 221 advances the processing to step S501. The descriptions of steps S501 to S814 and steps S520 to S524 are omitted since they are already described.

In step S515, the CPU 221 determines whether a Trim command is being executed on the partition of which the flag is set to 1. If a Trim command is not being executed (NO in step S515), the CPU 221 advances the processing to step S1018. If a Trim command is being executed (YES in step S515), then in step S516, the CPU 221 will be waiting until the Trim execution completes. In step S516, the CPU 221 receives a notification of the completion of the Trim execution from the eMMC 224 (YES in step S516), and then advances the processing to step S1018.

In step S1018, the CPU 221 determines whether there is any partition of which the flag is set to 1. If there is no partition of which the flag is set to 1 (NO in step S1018), the CPU 221 advances the processing to step S817. If there is the partition of which the flag is set to 1 (YES in step S1018), the CPU 221 advances the processing to step S1019.

In step S1019, the CPU 221 calculates a time (a Trim completion time) required if the Trim command is continuously executed from the partition of which the flag is set to 1 to the last partition number (the number 10 in FIG. 6) in the partitions as the Trim execution targets. Then, the CPU 221 compares the Trim continuation time set in step S1000 with the Trim completion time. If the Trim completion time is longer than the Trim continuation time (YES in step S1019), the CPU 221 interrupts the Trim execution on the next partition and advances the processing to step S817. The descriptions of steps S817 to S819 are omitted since they are already described.

If the Trim completion time is shorter than the Trim continuation time (NO in step S1019), the CPU 221 returns the processing to step S509 to continue the Trim execution.

According to the present exemplary embodiment, with a print request of a print job received during execution of a Trim command on the eMMC, the image forming apparatus also can shorten a waiting time until completion of the print job. In other words, the image forming apparatus can perform both Trim processing on the eMMC and the response to a print job request in the standby mode, enhancing convenience for the user.

Figure 5A:
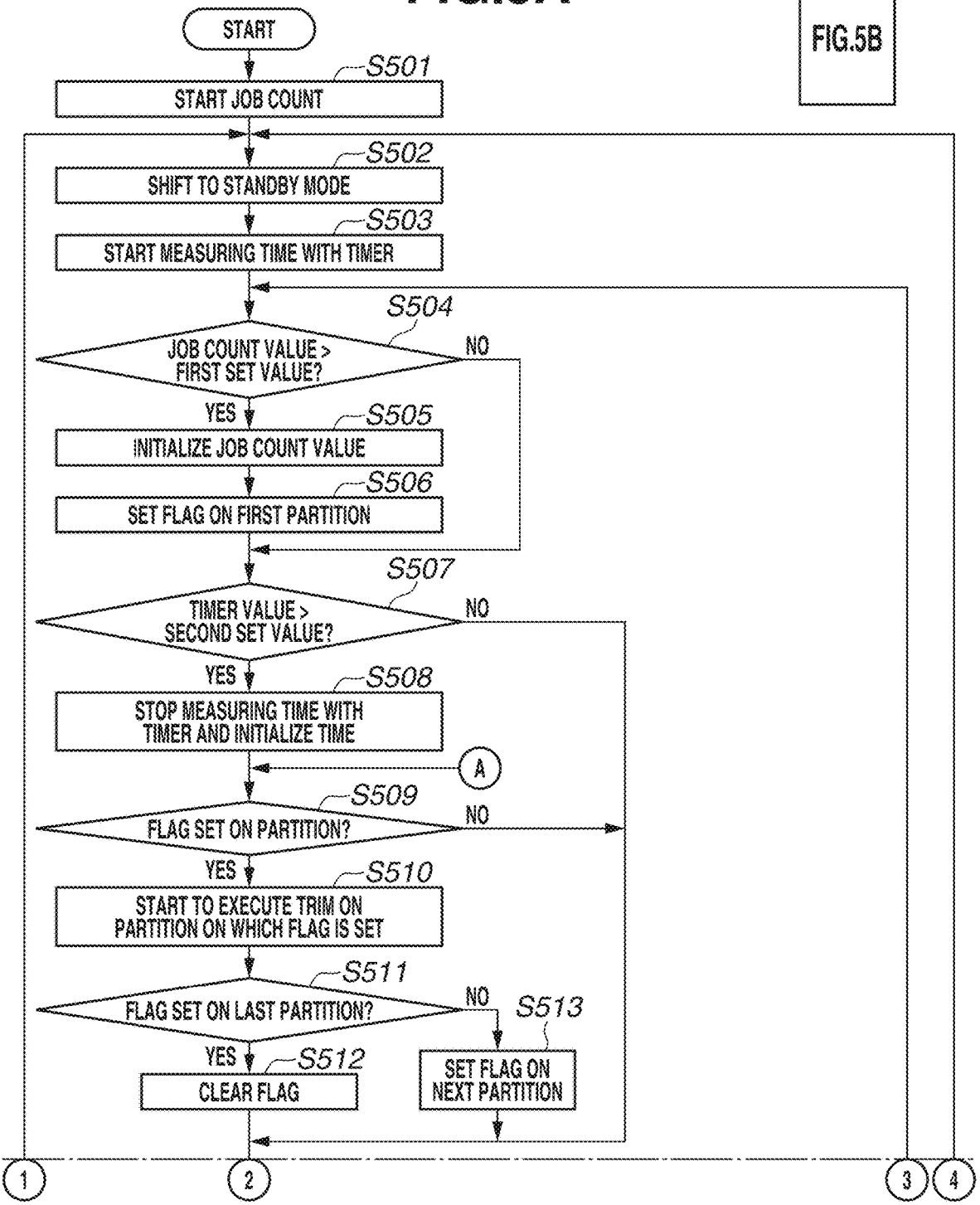
FIGS. 5A and 5B (FIG. 5) are a flowchart illustrating processing in receiving a fax job of the image forming apparatus according to the first exemplary embodiment.
Figure 5B:
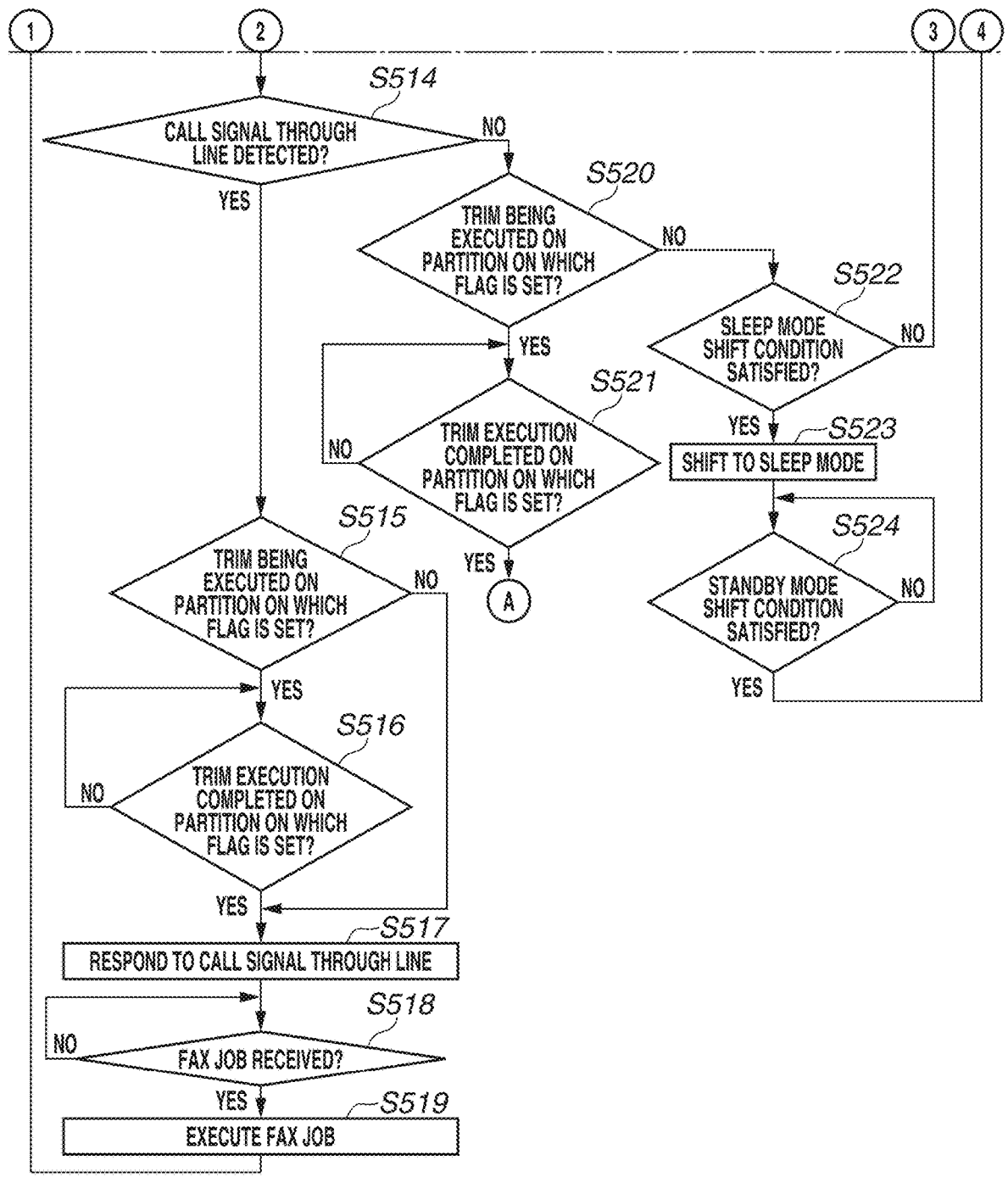

The processing in steps S1000, S1018, and S1019 according to the third exemplary embodiment may be applied to the processing illustrated in the flowchart in FIGS. 5A and 5B according to the first exemplary embodiment. In this case, after the processing in step S1000, the CPU 221 advances the processing to step S501. In addition, the CPU 221 advances the processing to step S1018 if YES in step S516 or NO in step S515, and advances the processing to step S517 if NO in step S1018 or YES in step S1019.

Other Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2019-230912, filed Dec. 20, 2019, which is hereby incorporated by reference herein in its entirety.

What is claimed is:

1. An apparatus comprising:
a nonvolatile semiconductor storage having a semiconductor area divided into a plurality of partition areas;
wherein the semiconductor storage is configured to execute erasure processing sequentially in the partition areas based on information about the partition areas in which unused data is stored in the semiconductor area in a case where a command is received;
a communication interface configured to communicate with an external apparatus via a network line;
a controller having one or more processors which execute instructions stored in one or more memories, the controller being configured to:
notify the semiconductor storage of the command and cause the semiconductor storage to execute the erasure processing;
cause the semiconductor storage to complete the erasure processing on a partition area on which the erasure processing is being executed among the plurality of partition areas, and to execute stop processing of not executing the erasure processing on a partition area not yet subjected to the erasure processing among the plurality of partition areas, upon reception of a print request from the external apparatus while the semiconductor storage is executing the erasure processing; and
transmit a response signal for the print request to the external apparatus, upon completion of the stop processing.

2. The apparatus according to claim 1, wherein the command is a trim command to cause the semiconductor storage to execute Trim processing.

3. The apparatus according to claim 1, wherein after the controller responds to the print request, the controller receives a print job by the communication interface and executes the received print job.

4. The apparatus according to claim 3, wherein the erasure processing is executed on the partition area not yet subjected to the erasure processing in a case where the apparatus is in the standby state after the stop processing is completed and the print job is executed.

5. The apparatus according to claim 1, wherein the information about the partition areas is manages information indicating whether the erasure processing is to be executed on each of the plurality of partition areas.

6. The apparatus according to claim 1,
wherein the controller determines whether the partition area not yet subjected to the erasure processing is included in the plurality of partition areas, and
wherein, in a case where the partition area not yet subjected to the erasure processing is not included, the apparatus shifts to a sleep state in which power consumption is lower than that in a standby state if a predetermined condition is satisfied.

7. The apparatus according to claim 1, wherein the controller sequentially executes the erasure processing on the plurality of partition areas.

8. The apparatus according to claim 1, wherein the nonvolatile semiconductor storage is an embedded Multi Media Card.

9. A method for controlling an apparatus including a nonvolatile semiconductor storage having a semiconductor area divided into a plurality of partition areas and a communication interface configured to communicate with an external apparatus via a network line, the method comprising:
executing erasure processing sequentially in the partition areas based on information about the partition areas in which unused data is stored in the semiconductor area in a case where a command is received;
notifying the semiconductor storage of the command and cause the semiconductor storage to execute the erasure processing;
causing the semiconductor storage to complete the erasure processing on a partition area on which the erasure processing is being executed among the plurality of partition areas, and to execute stop processing of not executing the erasure processing on a partition area not yet subjected to the erasure processing among the plurality of partition areas, upon reception of a print request from the external apparatus while the semiconductor storage is executing the erasure processing; and
transmitting a response signal for the print request to the external apparatus, upon completion of the stop processing.

10. The method according to claim 9, wherein the command is a trim command to cause the semiconductor storage to execute Trim processing.

11. The method according to claim 9, wherein the nonvolatile semiconductor storage is an embedded Multi Media Card.

12. An apparatus comprising:
a nonvolatile semiconductor storage having a semiconductor area divided into a plurality of partition areas,
wherein the semiconductor storage is configured to execute erasure processing sequentially on the partition areas based on information about the partition areas in which unused data is stored in the semiconductor area in a case where a command is received;
a communication interface configured to communicate with an external apparatus via a telephone line;
a controller having one or more processors which execute instructions stored in one or more memories, the controller being configured to:
notify the semiconductor storage of the command and cause the semiconductor storage to execute the erasure processing;
cause the semiconductor storage to complete the erasure processing on a partition area on which the erasure processing is being executed among the plurality of partition areas, and to execute stop processing of not executing the erasure processing on a partition area not yet subjected to the erasure processing among the plurality of partition areas, upon reception of a call signal of a facsimile from the external apparatus while the semiconductor storage is executing the erasure processing; and
transmit a response signal for the call signal of the facsimile to the external apparatus, upon completion of the stop processing.

13. The apparatus according to claim 12, wherein the command is a trim command to cause the semiconductor storage to execute Trim processing.

14. The apparatus according to claim 12,
wherein the communication interface receives a facsimile job after the communication interface transmits the response signal to the external apparatus, and
wherein the controller executes the facsimile job according to reception of the facsimile job by the communication interface.

15. The apparatus according to claim 12, wherein the controller notifies the semiconductor storage of the information in a case where the apparatus is in a standby state in which the print job is executable by the apparatus.

16. The apparatus according to claim 15, wherein the erasure processing is executed on the storage area not yet subjected to the erasure processing in a case where the apparatus is in the standby state after the erasure processing is stopped and the facsimile job is executed.

17. The apparatus according to claim 12, wherein the information about the partition areas is information indicating whether the erasure processing is to be executed on each of the plurality of partition areas.

18. The apparatus according to claim 12,
wherein the controller determines whether the partition area not yet subjected to the erasure processing is included in the plurality of partition areas, and
wherein, in a case where the partition area not yet subjected to the erasure processing is not included, the apparatus shifts to a sleep state in which power consumption is lower than that in a standby state if a predetermined condition is satisfied.

19. The apparatus according to claim 12, wherein the nonvolatile semiconductor storage is an embedded Multi Media Card.

* * * * *